May 26, 1970          G. WALDES          3,514,511
SLIDE FASTENER MANUFACTURE METHOD
Filed Dec. 30, 1966
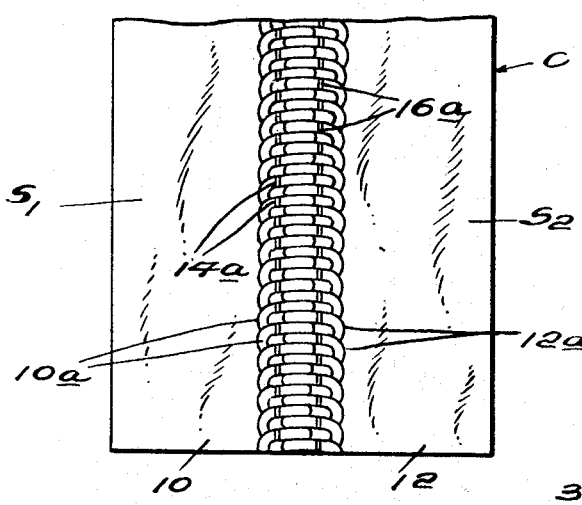
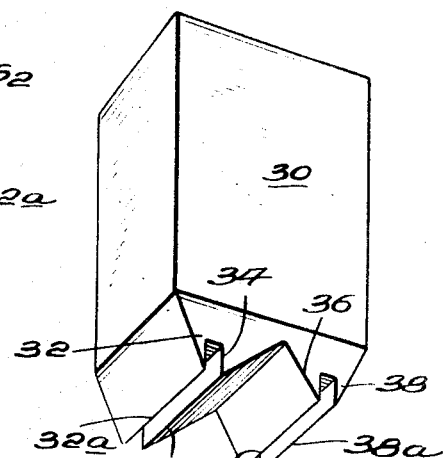
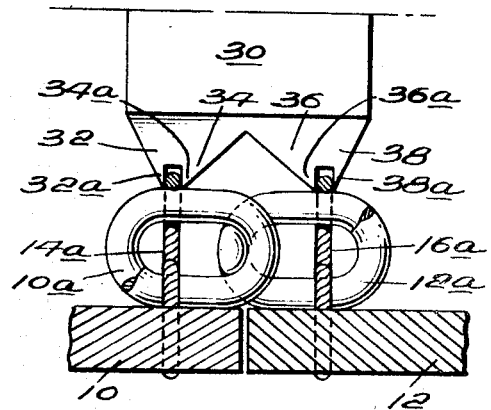
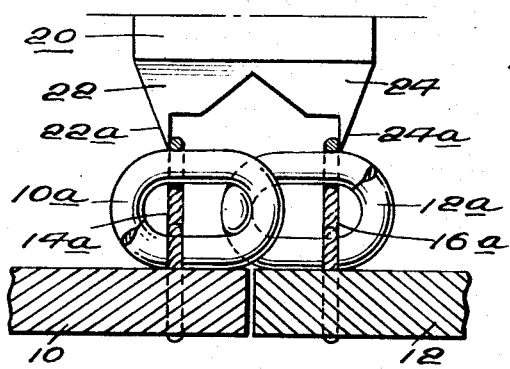
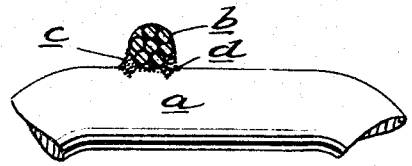
INVENTOR.
GEORGE WALDES,
BY
Harold Kilcoyne
ATTORNEY

United States Patent Office 3,514,511
Patented May 26, 1970

---

3,514,511
SLIDE FASTENER MANUFACTURE METHOD
George Waldes, Plandome, N.Y., assignor to Waldes Kohinoor, Inc., Long Island City, N.Y., a corporation of New York
Filed Dec. 30, 1966, Ser. No. 606,142
Int. Cl. B29c *27/06, 27/28;* B29d *5/00*
U.S. Cl. 264—248                    3 Claims

---

ABSTRACT OF THE DISCLOSURE

Method of fixing the stitches which secure the thermoplastic coils of continuous plastic-coil slide-fastener chains to their tapes to prevent them from unloosening when the plastic chain is cut into a plurality of fastener or zipper lengths. A heated tool is used which applies local heat and pressure progressively to points on the top portions of the plastic coils adjacent the crossing-over portions of the stitches, thereby softening and causing limited flow of the plastic material towards said stitches and progressive fixing thereof to the top portions of the plastic coils upon re-hardening of the softened plastic material.

---

This invention relates generally to slide fastener manufacture, and is more particularly directed to the provision of an effective method of positively fixing the stitches conventionally employed to secure the plastic coils of coil-type slide fastener or zipper chains to their respective tapes thereby reducing the possibility of the stitches shifting or of unloosening adjacent cut-through ends thereof.

The present-day trend in the slide fastener industry is towards the so-called plastic-coil slide fastener or zipper chain wherein, rather than the fastener or zipper chains comprising rows of individual interengaging fastener elements or scoops clamped or molded to beads or cords sewn or otherwise secured to the adjacent longitudinal edges of a pair of tapes, said fastener or zipper chains instead comprise such tapes having intermeshing coils or helices of plastic filaments, commonly called plastic coils, secured to their longitudinal edge portion by rows of stitches. When according to now standard manufacturing procedure such plastic coil chain is made up in long lengths of so-called continuous chain which is subsequently severed or "cut-apart" to individual or finished zipper lengths as needed, a problem arises consequent to the stitches loosening adjacent the lines of severence which extend transversely across the chain and in so doing cut through both the coils and the threads of the stitches. More particularly, when the stitches loosen as aforesaid, the coils tend to "stick up" from their tapes adjacent their cut ends, which can introduce difficulties in assembling the slider by which the finished zipper is to be opened and closed in normal use thereof. Loosening of the stitches as aforesaid can also result in lateral shift of these portions of the stitches which extend crosswise over the tops of the loops or convolutions of the plastic coils to a degree interfering both with the smooth intermeshing of the inner-end portions of said lops or convolutions and with the free and easy slider movement along the length of the finished zippers.

Generally stated, a primary object of the invention is the provision of an effective method of fixing the stitches which secure the plastic coils of plastic coil-type slide fastener or zipper chain to their tapes in manner as reduces unloosening of the stitches and/or lateral shifting of the portions thereof which cross the loops or convolutions of said plastic coils.

A more particular object of the invention is the provision of a method as aforesaid which utilizes the plastic material of the plastic coils as the stitch sealing or bonding medium.

A further object of the invention is the provision of a method of applying heat to the plastic coils of a plastic coil-type continuous slide fastener chain which are secured to their tapes by rows of stitches which, in progressing along the coils, extend crosswise over the tops of the loops or convolutions of said coils, in manner as to effect fixing of the crosswise portions of the stitches directly to the plastic coils themselves, to the desirable end that said stitches are effectively prevented from loosening from said tapes when they are cut through consequent to zipper lengths of chain being cut apart from said continuous chain.

Briefly stated, the foregoing objects are accomplished by running the continuous plastic-coil chain, following is manufacture and before it is cut apart into zipper lengths, through a so-called heater which applies localized heat to points or places on the top portions of each of the loops or convolutions of the plastic coils immediately adjacent and preferably just to one or both sides of the portions of the stitches which pass crosswise over said loops or convolutions. As the direct result of such heating, the plastic material of the plastic coils (which is conventionally a thermoplastic material) is softened at or immediately adjacent the portions of the plastic-coil loops or convolutions crossed by said stitches, whereupon it tends to secure to the fibers or strands of the threads making up the stitches, and also permits the stitches to "bed down" or settle to a limited degree into the top-surface portions of the loops or convolutions which they cross.

The net result achieved by such localized heat-softening of the plastic material of the plastic coils as aforesaid is that a firm thread-seal is formed for the entire length of the plastic-coil continuous chain, with the desirable result that it can be cut apart to any desired length or lengths of zipper chain desired, with assurance that the stitches which secure the plastic coils to their tapes will not loosen when cut through in the cutting-apart operation and/or shift laterally with respect to the loops or convolutions which they cross.

In the accompanying drawing, illustrative of the manner in which the method of the invention may be practiced, FIG. 1 is a fragmentary plan view showing a short length of continuous plastic-coil slide fastener chain to which the method of the invention is applicable, and FIG. 2 is an end view thereof;

FIG. 3 is an enlarged transverse section taken through a continuous plastic-coil fastener chain according to FIGS. 1 and 2 and which illustrates said chain being acted upon by a heater functioning to apply localized heat to the loops or convolutions of the intermeshed plastic coils thereof, and more particularly to points thereof disposed just outwardly of those portions of the stitches securing the coils to their tapes which pass crosswise over the tops of said loops or convolutions;

FIG. 4 is a view similar to FIG. 3, but illustrating the plastic-coil chain being acted upon by a modified form of heater which applies localized heat to spaced points of the plastic-coil loops or convolutions which are disposed both outwardly and inwardly of the crossing-over portions of said stitches;

FIG. 5 is a perspective view looking upwardly on to the underneath working surface of the modified heater according to FIG. 4; and FIG. 6 is a detail view showing on an enlarged scale a crossing-over of a stitch sealed to the top portion of a loop or convolutions of one of the plastic coils.

Referring to the drawing in detail, FIG. 1 illustrates that a plastic-coil slide fastener chain C to which the present method is applicable comprises a pair of fastened-together stringers $S_1$ and $S_2$ which in turn are provided by a pair of flexible (usually fabric) tapes 10 and 12 carrying plastic coil-type fastening means 10a, 12a along their adjacent longitudinal edges. As is well understood, the tapes provide the means for securing individual zipper lengths of chain cut to proper length from said chain C which, according to present manufacturing practice, is made up in long, continuous-strip form, to the opposite sides of a garment opening or placket for which the finished zipper comprising said zipper length of chain and an operating slider assembled thereto (not shown) provides a separable closure means.

It will also be understood that the plastic coils 10a, 12a are each formed of a plastic filament shaped to general coil or helical formation and that said coils are secured to the adjacent edges of their respective fabric tapes 10, 12 by rows of stitches designated 14a, 16a. While any one of the prior-art forms of plastic coil- or filament-type fastening means may be employed, the plastic coils shown for purpose of simple disclosure are characterized by somewhat flattened or oval configuration, with the individual loops or convolutions thereof being disposed in generally parallel relation when viewed from above. FIG. 2 in particular illustrates that the relatively inner-end portions of the loops or convolutions intermesh with one another, and that the relatively outer-end portions of said loops which are secured by the rows of stitches 14a, 16a locate said coils transversely of their tapes in position such that their said inner-end portions project somewhat beyond the corresponding inner edges of said tapes so that they are free to intermesh with one another.

As is best seen in FIGS. 3 and 4, which show the coils 10a, 12a to be secured each by a single row of the stitches 14a, 16a, said stitches, as they progress along the length of the coils, pass crosswise over the top portions of each of the loops or convolutions making up same. This relationship of stitch to plastic-coil loop or convolution has been found to be a favorable one as respects fixing the stitches against loosening as is very likely to occur consequent to the cutting-apart operation adjacent the transverse lines of cut made through the tapes, coils and stitches.

More in detail, the invention provides for the sealing and thereby the fixing of the stitches 14a, 16a to the top surfaces of the loops or convolutions of the plastic coils 10a, 12a at points or locations of the latter where the stitches cross over the same. Such is achieved by applying localized heat to the top surfaces of the loops or convolutions of the plastic coils 10a, 12a in manner as and degree sufficient to soften the plastic material of said plastic coils at points or locations thereof disposed immediately adjacent the crossing-over portions of the stitches. Thus, referring to FIG. 3, illustrating one simple means of applying localized heat as aforesaid to the plastic coils, reference numeral 20 generally designates a heating tool comprising essentially a tool body having two laterally spaced-apart and longitudinally extending ribs 22, 24 projecting downwardly from its under side, the ribs terminating in knife edges 22a, 24a which are spaced apart a distance equal to the spacing between the two rows of stitches 14a, 16a as measured from the outer sides thereof. While not shown, the tool body, including its downwardly projecting ribs 22 and 24 and the knife edges provided on the latter, is heated throughout by a heating coil (or coils) mounted in the tool head.

Thus, by the simple procedure of lowering the tool 20 against a plastic-coil chain suitably supported from below and positioned so that the knife edges 22a, 24a will make contact with and to a degree will bear simultaneously on the top surfaces of a limited number of the intermeshed loops or convolutions of the plastic coils 10a, 12a thereof, just outwardly of the stitch portions which cross said top surface, and thereupon of drawing or pulling said chain lengthwise of the tool so that the latter's knife edges make running engagement with the plastic coils, the plastic material of the intermeshed convolution of said coils is softened immediately to the sides of the crossing-over portions of the stitches. In addition to their action in softening the plastic material of the plastic coils as aforesaid, the knife edges 22a, 24a function to score or sink tiny grooves in the top surfaces of the plastic-coil loops or convolutions, immediately to the outer sides of the crossing-over portion of the stitches 14a, 16a. The net result of the aforesaid softening and grooving or scoring of the plastic material of the coils 10a, 12a is that the thus softened plastic material is caused to flow to a limited degree into the fibers or strands of the threads of the stitches and further enables the crossing-over portions of the stitches to slightly bed or settle into the plastic material of the coils. It follows that when the softened plastic material of the coils rehardens, it forms a firm and secure seal with the stitches 14a, 16a at each of the multiplicity of the points where the stitches cross over the top surfaces of the coil loops or convolutions.

FIGS. 4 and 5 illustrate a carrying forward of the stitch-to-plastic coil fixing and sealing action just described, to the end of achieving yet greater stitch-sealing effectiveness. That is to say, FIG. 4 illustrates the action of a modified heat-applying tool designated 30 which is provided on its under or working surface with spaced pairs of longitudinally extending ribs designated 32, 34 and 36, 38 terminating, respectively, in the knife edges 32a, 34a and 36a, 38a, as distinguished from the but two laterally spaced ribs 22, 24 and knife edges 22a, 24a of the previously described tool 20. It will be seen from FIGS. 4 and 5 that the knife edges making up each said pair thereof are spaced apart a distance substantially equal to the diameter of the threads used in sewing the stitches 14a, 16a and that the pairs of the knife edges are spaced apart a distance such that they are adapted to engage the top surfaces of the coils or convolutions of the plastic coils immediately adjacent both outer and inner sides of the stitches, as distinguished from the outer sides only, as in FIG. 3.

Thus, when the tool 30 is lowered against the endmost intermeshed convolutions of the coils 10a, 12a of a plastic-coil chain and then the chain and tool are moved longitudinally relatively of one another, its knife edges 32a, 34a and 36a, 38a will progressively soften and score the plastic material of the plastic coils 10a, 12a simultaneously at four laterally spaced points thereof which are disposed immediately to both sides of the crossing-over portions of the stitches 14a, 16a, as results in either or both the softened plastic material being caused to flow to a limited degree into the fibers or strands of the stitch threads from both sides thereof and in such limited settling or bedding of the stitch threads into the softened plastic material of the coils, as ultimately, i.e. upon rehardening of the softened plastic material, provides a firm and secure sealing and fixing of the stitches in proper position to the plastic coils.

FIG. 6 illustrates the stitch or thread-to-plastic coil sealing and fixing action attained by the practice of the invention as such can be readily illustrated. More particularly, reference letter a designates the top portion of a loop or convolution of one of the plastic coils 10a, or 12a, and b designates the stitch portion (shown in transverse section) of one of the rows of securing stitches 14a, 16a which crosses said top portion and bears on its upper surface. Reference letters c and d indicate points on the upwardly facing surface of said top portion of the partial loop or convolution shown which have been engaged and scored by the heated knife edges of one of the pairs 32a, 34a or 36a, 38a thereof. As indicated by the stippling, the plastic material of said partial loop or convolution has been softened and to a limited extent caused to flow towards said stitch thread and thence into the fibers or strands thereof. Also, due to the plastic material of the surface portion of the partial loop or convolution having been softened at points to the sides of and to some extent below said stitch thread b, the latter settles or beds a limited amount into the softened plastic material. The result is that when the plastic material rehardends a firm seal of thread to plastic surface and hence a fixing of the stitches made by said thread is achieved.

This sealing and fixing of the stitches to the very plastic coils which they secure accomplishes novel results, as follows:

When the continuous chain treated according to the present invention is cut apart to provide finished zipper lengths, unloosening of the stitches adjacent the lines of cut is effectively prevented and hence slider assembly is facilitated.

Due to the stitches being fixed to the plastic coils which they secure, lateral shifting of the stitches with respect to the loops or convolutions of the coil which if occurring is likely to interfere with intermeshing of the oppositely disposed plastic coils is positively prevented.

When the plastic coils are firmly held by the sealed and fixed stitches as is made possible by the practice of the invention, shifting of the coils from underneath the stitches in either direction, i.e. longitudinally or transversely, is lessened, such in turn reducing the possibility of mis-meshing of the coils, and insuring that said coils form a well defined track for the slider which improves its sliding action.

The sealing and fixing of the stitches which secure the plastic coils directly to the coils lessens the possibility of the threads from which the stitches are sewn becoming abraded by action of the slider thereon, since they cannot be shifted or worked into corners of the slider channel where they could be damaged by slider movement, and thus the practice of the invention has the desirable effect of prolonging the life of the finished zipper treated according thereto.

While a preferred procedure and means for effecting localized softening of the plastic material of the plastic coils of a slide fastener chain employing such coils as the fastening means thereof have been described and illustrated, it is to be understood that changes and modifications may be made therein without departing from the scope of the invention. As an example, softening of said plastic material may be effected by induction and convection-type heating means rather than by the conduction-type heating means shown, and the use of such alternative heating means is considered to be clearly within the scope of the invention.

I claim:

1. In the manufacture of continuous plastic-coil slide fastener chain subsequently to be cut apart into a multiplicity of zipper lengths of chain and comprising long lengths of intermeshed plastic coils secured to the adjacent longitudinal edges of a pair of fabric tapes by longitudinal rows of stitches which pass crosswise over the top portions of the successive convolutions of said plastic coils, the method of fixing said stitches directly to said plastic coils which they secure and thereby prevent them from unloosening from said tapes and/or shifting their position on said convolutions when they are cut through incident to the chain being cut apart into zipper lengths as aforesaid, which comprises the steps of:

(a) providing a tool adapted when engaged therewith to apply localized heat and light scoring pressure simultaneously to laterally spaced points on the top surfaces of a small number of the intermeshed convolutions of said coils and which are disposed closely adjacent to at least the outer sides of said crossing-over portions of the stitches, as effects limited softening of the plastic material of the coils, limited flow thereof laterally towards said crossing-over portions of the stitches and thereupon a limited settling of the stitches into the so softened plastic material;

(b) engaging said tool with said spaced points as aforesaid;

(c) imparting relative movement between said continuous chain and said tool, thereby progressively softening the plastic material of the intermeshed convolutions of the plastic coils for the full length of the chain;

and finally allowing the so softened plastic material to reharden as effects the progressive fixing of the threads in the material of the plastic coils which they secure.

2. The method according to claim 1, wherein said tool is formed and adapted to apply heat and light scoring pressure simultaneously to laterally spaced points on the top surfaces of each of said intermeshed convolutions, which points are disposed closely adjacent to both the outer and inner sides of said crossing-over portions of the stitches, whereby engagement of said tool with said spaced points effects a limited flow of softened plastic material in both directions towards said crossing-over portions of said stitches.

3. The method according to claim 1, wherein said tool comprises parallelly disposed, short-length knife edges which are spaced apart a distance substantially equal to the spacing between said rows of stitches.

References Cited

UNITED STATES PATENTS

| 3,376,179 | 4/1968 | Balamuth | 264—23 XR |
| 2,470,963 | 5/1949 | Wehl | 264—248 XR |
| 2,974,566 | 3/1961 | Hurley | 264—25 XR |
| 3,231,936 | 2/1966 | Guilie | 264—248 XR |
| 3,296,990 | 1/1967 | Simjian | 264—23 XR |
| 3,316,134 | 4/1967 | Durakis | 264—248 XR |
| 3,320,346 | 5/1967 | Galitzki | 264—229 |
| 3,337,672 | 8/1967 | Steingrubner | 264—281 |
| 3,379,814 | 4/1968 | Bracey | 264—322 |

ROBERT F. WHITE, Primary Examiner

R. R. KUCIA, Assistant Examiner

U.S. Cl. X.R.

264—145, 281